Nov. 3, 1931.        J. S. MORGAN        1,830,440
SWIVEL WASH PIPE CONSTRUCTION
Filed Sept. 3, 1929        2 Sheets-Sheet 1

Inventor
John S. Morgan
By Lyon & Lyon
Attorneys

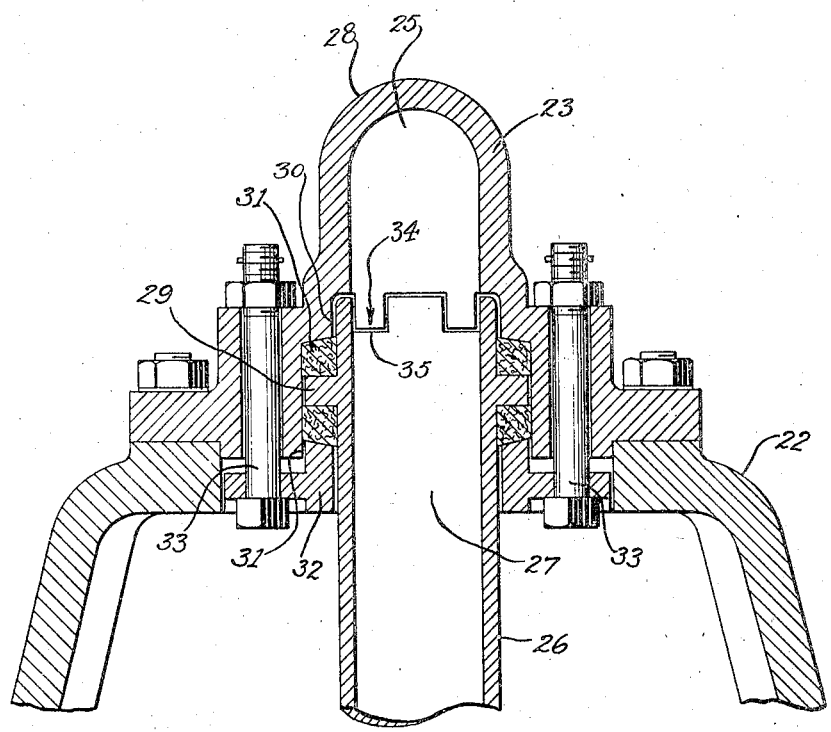

Patented Nov. 3, 1931

1,830,440

UNITED STATES PATENT OFFICE

JOHN S. MORGAN, OF TORRANCE, CALIFORNIA, ASSIGNOR, BY MESNE ASSIGNMENTS, TO THE NATIONAL SUPPLY COMPANY, OF TOLEDO, OHIO, A CORPORATION OF OHIO

SWIVEL WASH PIPE CONSTRUCTION

Application filed September 3, 1929. Serial No. 390,021.

This invention relates to improvements in swivel wash pipe construction. Swivel wash pipes as usually constructed have a rigid connection between the body of the swivel and the wash pipe. The purpose of this connection is to provide a fluid tight joint and yet allow replacement of the wash pipe when necessitated by wear or breakage. As usually constructed, the wash pipe connection or joint consists of either a threaded or flanged construction at the fluid entrance of the wash pipe which fits into or on a mating connection in the body or gooseneck of the swivel. The lower end of the wash pipe usually extends into the sleeve or revolving portion of the swivel which is provided with a stuffing box and packing to form a fluid tight joint and yet allow the sleeve to rotate around the stationary wash pipe.

It is important that the axis of the wash pipe and sleeve coincide to eliminate undue strain and wear on the wash pipe, sleeve stuffing box packing and sleeve stuffing box bearing. Natural wear of the bearings supporting the sleeve allow the sleeve to move from its normal axis or the axis coinciding with the axis of the wash pipe, and thereby putting a heavy strain upon the wash pipe and causing undue wear of the wash pipe, stuffing box packing and stuffing box bearing, and further should the sleeve stuffing box be packed unevenly, or packed with packing of uneven thickness, the wash pipe would be severely strained as it would be forced to follow the eccentric path of the uneven packing, thus causing further undue strain and wear on the wash pipe, sleeve stuffing box packing and the sleeve stuffing box bearing.

It is one of the principal objects of this invention to prevent undue wear of the wash pipe, sleeve stuffing box packing and sleeve stuffing box bearing by providing a fluid tight joint or connection between the body or gooseneck of the swivel and wash pipe flexible enough to allow movement of the wash pipe from its normal axis in order to accommodate the movement of the sleeve.

It is a further object to provide the flexible fluid tight connection between the swivel body or gooseneck and the wash pipe to compensate for slight errors in alignment between the wash pipe and sleeve stuffing box due to wear of the sleeve bearing, inequality of stuffing box packing, and also natural and unavoidable errors in manufacture.

It is a further object to provide a flexible wash pipe connection which would be economical to manufacture, easily assembled and easily replaced in case of wear.

It is a further object to clamp the collar or flange of the fluid entrance end of the wash pipe between resilient packing to form a flexible fluid tight connection between the wash pipe and body or gooseneck of the swivel.

It is a further object to prevent the wash pipe from rotating by any suitable means, such as a locking lug positioned in the gooseneck and coacting with a notch in the upper end of the wash pipe.

It is a further object to provide a connection between the wash pipe and swivel body or gooseneck flexible enough to eliminate breakage of the wash pipe due to vibration.

Swivels as usually constructed consist of a load supporting member or sleeve rotating on ball or roller bearings encased in an oil tight case or body. Due to the axis of the sleeve being vertical, it is necessary to provide an oil seal between the body of the swivel and sleeve to prevent loss of lubricating oil. The usual construction is to provide a stuffing box and gland at the lower end of the swivel body incorporating suitable packing operating on the rotary sleeve. This packing must be kept tight, and this causes wear on that portion of the sleeve in contact with the packing requiring repair or replacement of the sleeve, which is an important and expensive part of the swivel.

It is a further object of this invention to provide a secondary sleeve or bushing which can be readily replaced when worn, the sleeve or bushing will be fastened to, and rotate with, the main sleeve and extend with the sleeve through the lower body stuffing box. A bearing sleeve bushing may be provided where the sleeve passes through the upper body stuffing box.

Other objects and advantages of this invention it is believed will be apparent from the following detailed description of a preferred embodiment thereof as illustrated in the accompanying drawings.

In the drawings:

Figure 3 is an enlarged sectional view of the flexible wash pipe mounting.

Figure 1:
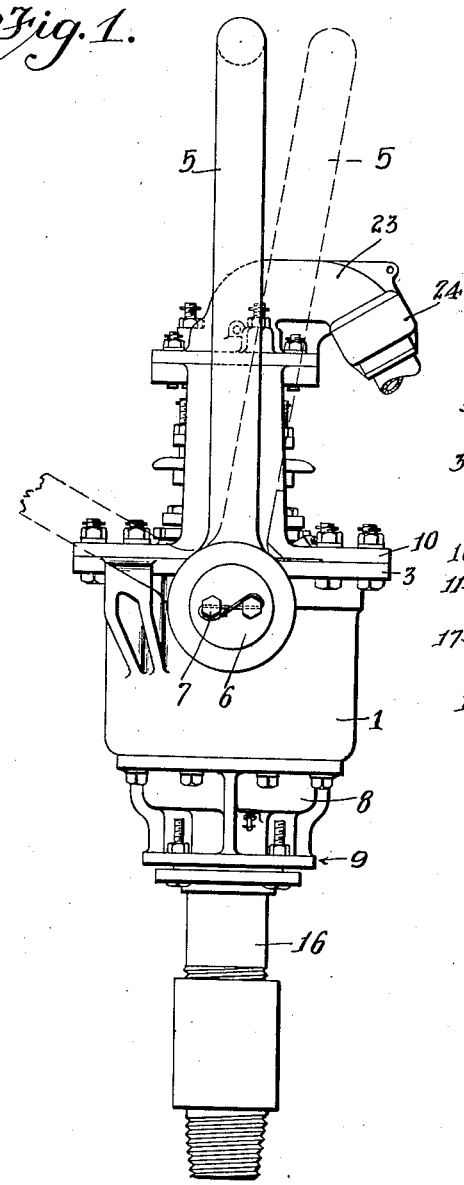
Figure 1 is a side elevation of my improved swivel.
Figure 2:
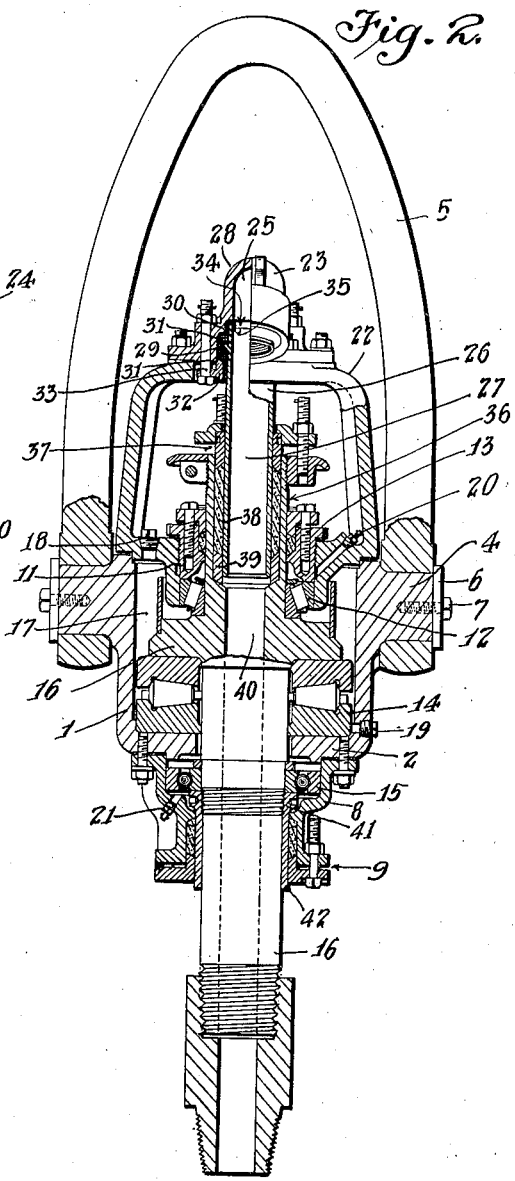
Figure 2 is a sectional view of Figure 1.

Referring more particularly to the parts, the swivel body 1 is of cylindrical form having the lower flange 2 and an upper flange 3, and two oppositely disposed trunnions 4. A bail 5 is rotatably mounted upon the trunnions 4. Plates 6 and cap screws 7 prevent the bearing ends of the bail 5 from sliding from the trunnions 4. Bolted to the lower flange 2 is a flange radial bearing bracket 8 which is provided at its lower end with a stuffing box unit 9. The flange radial bearing bracket 8 with its stuffing box unit 9 forms, together with rotating sleeve 16, an oil-tight closure for the lower side of the swivel body 1. Bolted to the upper flange 3 is an upper flange 10 having a threaded cylindrical section 11 adapted to support a thrust bearing 12 and a thrust bearing adjusting nut and stuffing box unit 13.

The upper flange 10, together with its thrust bearing adjusting nut and stuffing box unit and the sleeve 16, forms an oil-tight closure for the upper side of the swivel body 1. Supported by the lower flange 2 of the swivel body 1 is a main thrust bearing 14, and carried by the flange radial bearing bracket 8 is a radial ball bearing 15. A sleeve 16 is supported and carried by the upper thrust bearing 12, the lower thrust bearing 14, and the radial bearing 15. The sleeve 16 extends through the upper stuffing box unit 13 and the lower stuffing box unit 9.

The swivel body 1, with its upper and lower closures, forms an oil-tight enclosure 17 within which the bearings 12, 14 and 15 operate in a bath of oil. To supply oil to the enclosure 17, I provide in the upper flange 10 an oil filler plug 18 and an oil drain plug 19 in the lower portion of the body 1, an upper thrust bearing oiling means 20 and a radial thrust bearing oiling means 21. Bolted to, or formed integral with, the upper flange 10 is a yoke 22. Bolted to, or formed integral with, the yoke 22 is a gooseneck 23 having provided at its outer end the usual hose connection 24. The gooseneck 23 is provided with a central bore 25. Flexibly mounted in the yoke end of the gooseneck 23 is a wash pipe 26 having a central bore 27 communicating with the central bore 25 of the gooseneck 23.

The wash pipe 26 fits loosely within the central bore 25 of the gooseneck, or loosely within a counterbore 28, having a depth greater than the distance the wash pipe extends into the gooseneck 23. The wash pipe has a collar 29 formed integral therewith or attached by any suitable means. The collar 29 is positioned a short distance from the upper end of the wash pipe 26. The collar 29 fits loosely into a second counterbore 30 of the gooseneck 23. The second counterbore 30 is not as deep as the first counterbore 28. The wash pipe 26 is flexibly held in position by packing rings 31 resiliently supporting the wash pipe collar 29, and the packing is adjustably held in position by means of the gland 32 adjustably bolted to the gooseneck 23 by means of bolts 33. The wash pipe 26 is locked against rotation by any suitable means such as a lug 34 positioned within the bore of the gooseneck 23 which extends into a notch 35 positioned in the upper edge of the wash pipe 26. The lower end of the wash pipe 26 extends through the stuffing box 36 formed in the upper end of the sleeve 16. The stuffing box 36 is provided with the usual packing gland 37, packing 38 and bearing 39. The sleeve 16 is provided with a central bore 40 communicating with a central bore 27 of the wash pipe. The radial bearing 15 is clamped to the sleeve 16 by means of a locking nut 41. Formed integral with the locking nut 41 is a bushing 42. The bushing 42 extends through the lower stuffing box unit 9 and by this arrangement the wear caused by the lower stuffing box 9 is directly upon the bushing 42 instead of upon the sleeve 16, thereby making it necessary to replace only the inexpensive bushing 42 when it becomes worn.

If desired, a similar bushing may be positioned upon the sleeve 16 where the sleeve 16 passes through the upper stuffing box unit.

Having fully described my invention, it is to be understood that I do not wish to be limited to the details herein set forth, but my invention is of the full scope of the appended claims.

I claim:

1. A swivel wash pipe mounting including, a swivel body, a fluid passage in said swivel body, a stuffing box in said fluid passage, a wash pipe, a collar positioned near one end of said wash pipe, said wash pipe and collar fitting loosely within said stuffing box, and packing within said stuffing box resiliently supporting said wash pipe and collar whereby a fluid tight flexible connection is formed.

2. A swivel wash pipe mounting including, a swivel body, a fluid passage through said body, a stuffing box in said fluid passage, a wash pipe, a collar positioned near one end of said wash pipe, said wash pipe and collar fitting loosely within said stuffing box, and packing within said stuffing box resiliently supporting said wash pipe and collar, a stuffing box gland mounted in said stuffing box through which said wash pipe extends, said stuffing box gland adjustably supporting said packing whereby a fluid tight flexible connection is formed.

3. A swivel wash pipe mounting having a swivel body, a fluid passage through said swivel body, a stuffing box in said fluid passage, a stuffing box gland for said stuffing box, means for adjustably regulating said stuffing box gland, a wash pipe having a collar positioned near one end, said wash pipe and collar fitting loosely within said stuffing box, said wash pipe extending loosely through said wash pipe gland, packing positioned on either side of said wash pipe collar and held in position by said stuffing box gland whereby a fluid tight flexible joint is formed.

4. A swivel wash pipe mounting including, a swivel body, a fluid passage in said swivel body, a stuffing box in said fluid passage, a wash pipe, a collar positioned near one end of said wash pipe, said wash pipe and collar fitting loosely within said stuffing box, means in said fluid passage for locking said wash pipe against rotation, and packing within said stuffing box resiliently supporting said wash pipe and collar whereby a fluid tight flexible connection is formed.

5. A swivel wash pipe mounting including, a swivel body, a fluid passage through said swivel body, a stuffing box in said fluid passage, a stuffing box gland for said stuffing box, means for adjustably regulating said stuffing box gland, a wash pipe having a collar positioned near one end, said wash pipe and collar fitting loosely within said stuffing box and said wash pipe extending loosely through said wash pipe gland, packing positioned on either side of said wash pipe collar and held in position by said stuffing box gland whereby a fluid-tight flexible joint is formed, and means in said fluid passage for locking said wash pipe against rotation.

6. A swivel wash pipe mounting including, a swivel body, a fluid passage through said body, means for connecting a source of fluid supply to one end of said fluid passage, a stuffing box positioned in the other end of said fluid passage, a stuffing box gland for said stuffing box, bolts for clamping said stuffing box gland to said swivel body, a wash pipe loosely mounted in said stuffing box and loosely extending through said stuffing box gland, and means in said fluid passage for locking said wash pipe against rotation.

7. A swivel wash pipe mounting having a swivel body, a fluid passage through said swivel body, a stuffing box in one end of said fluid passage, a stuffing box gland, means for adjusting said gland, a wash pipe having an enlargement at one end, said wash pipe and enlargement fitting loosely within said stuffing box and said wash pipe extending loosely through said gland, means for locking said wash pipe against rotation, packing clamped by said gland for resiliently holding the enlarged end of said wash pipe in said stuffing box, whereby a flexible fluid-tight joint is formed.

Signed at Torrance, Calif., this 28th day of August, 1929.

JOHN S. MORGAN.